United States Patent
Wang et al.

(10) Patent No.: US 7,730,129 B2
(45) Date of Patent: Jun. 1, 2010

(54) COLLABORATIVE COMMUNICATION PLATFORMS

(75) Inventors: Jinsheng Wang, Sunnyvale, CA (US); Lu Wang, Sunnyvale, CA (US)

(73) Assignee: Inbit, Inc., San Jose, CA (US)

( * ) Notice: Subject to any disclaimer, the term of this patent is extended or adjusted under 35 U.S.C. 154(b) by 1154 days.

(21) Appl. No.: 10/970,309

(22) Filed: Oct. 20, 2004

(65) Prior Publication Data
US 2006/0095514 A1   May 4, 2006

(51) Int. Cl.
*G06F 15/16* (2006.01)
(52) U.S. Cl. ................... 709/204; 709/219; 719/329
(58) Field of Classification Search ........... 709/204, 709/219; 719/329
See application file for complete search history.

(56) References Cited

U.S. PATENT DOCUMENTS 6,557,027 B1 * 4/2003 Cragun ................ 709/204
7,234,117 B2 * 6/2007 Zaner et al. ........... 715/758
7,353,252 B1 * 4/2008 Yang et al. ............ 709/204
2003/0126216 A1 * 7/2003 Avila et al. ............ 709/206

OTHER PUBLICATIONS

Using American Online—Third edition,. Gene Steinberg 1996.*
* cited by examiner

*Primary Examiner*—Tonia L. Dollinger
*Assistant Examiner*—Kyung H Shin
(74) *Attorney, Agent, or Firm*—Wuxi Sino-US IP Agency, Ltd.; Joe Zheng

(57) ABSTRACT

A collaborative communication system is disclosed. The collaborative communication system integrates a number of electronic communication tools to meet the collaborative communication needs for an enterprise, family members or friends. All communications are within the system. According to one aspect of the collaborative communication system, registered users in the system are provided public, group and private arenas or domains. Depending on the privacy, communications with others may be conducted in any one of these domains. According to another aspect of the collaborative communication system, communications with others can be conducted through electronic internal mail (herein "i-mail"), instant messaging and file sharing. In particular, the i-mail operates on identifiers pertaining to registered users, thus eliminating the possibility of the registered users receiving unwanted email from other users outside the system.

56 Claims, 12 Drawing Sheets

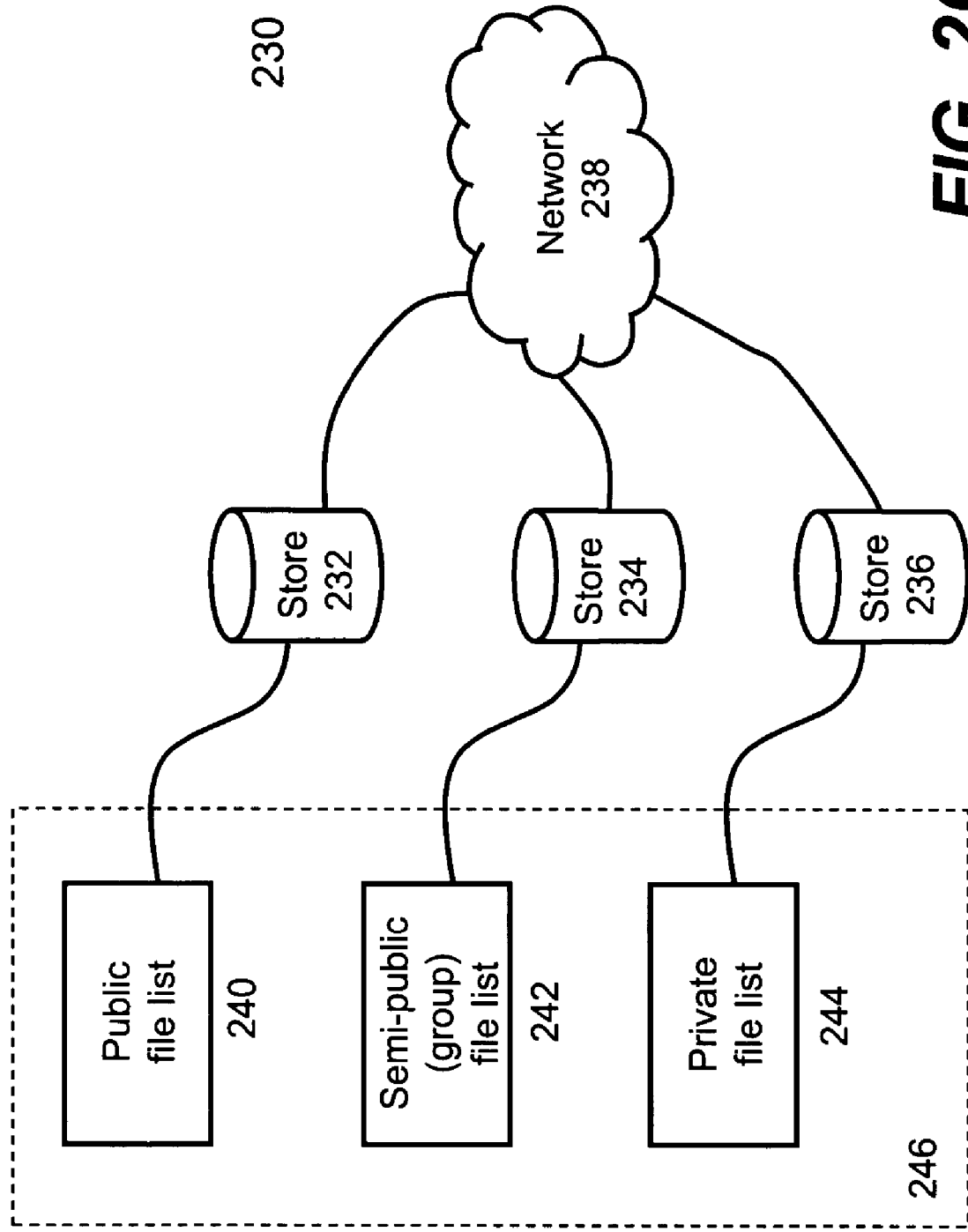

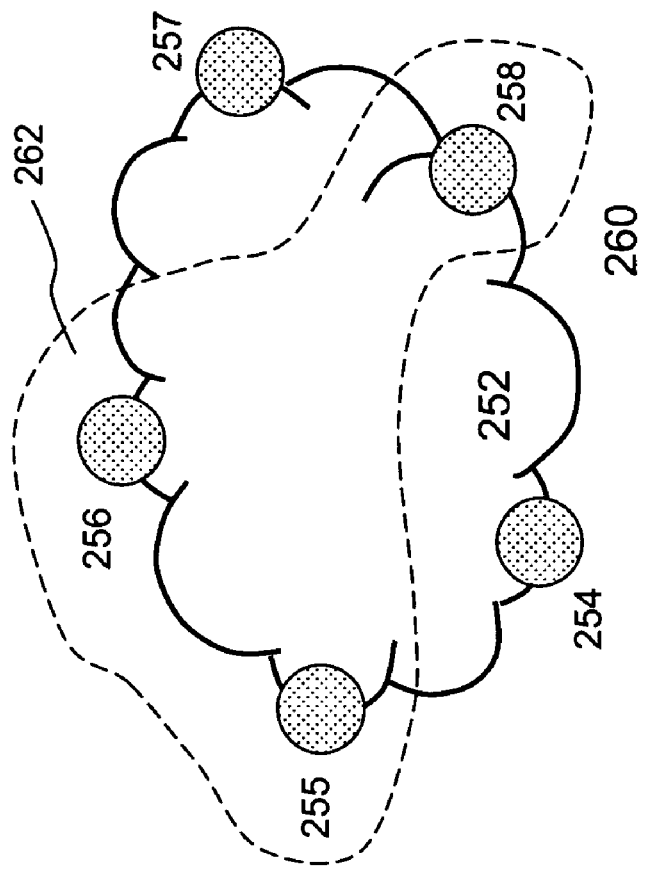
FIG. 3C
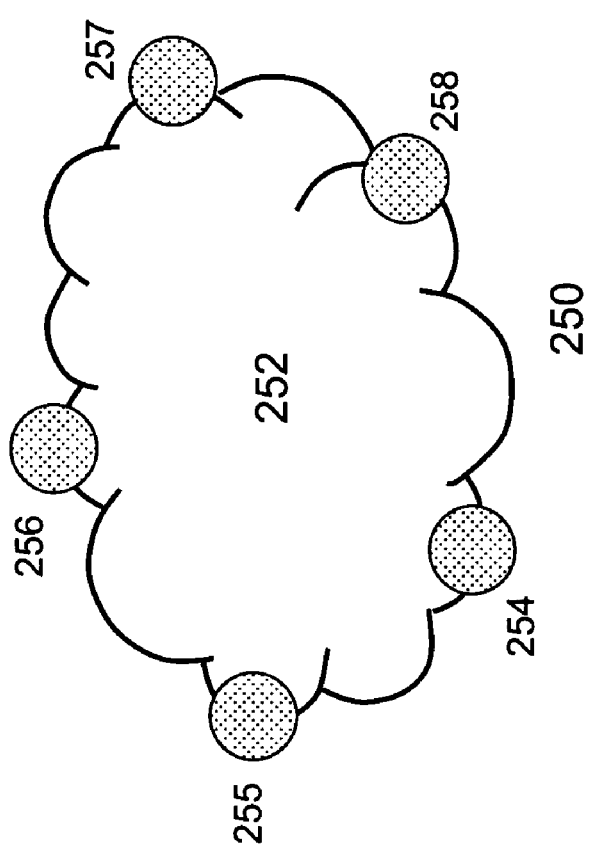
FIG. 3B *(Prior Art)*

| | Prior Art Email | i-mail |
|---|---|---|
| Account Setup | Step 1: Display Name<br>Step 2: Email address (e.g. john@abc.com)<br>Step 3: Server Type (POP3, IMAP, HTTP)<br>e.g.: incoming Server Name: pop3.abc.com<br>outgoing Server Name: smtp.inbit.com<br>Step 4: Account Name and Password on the server | YES<br>NO<br>NO<br><br>YES |
| Sender/Receiver Identity | Sender identity is not always known (thus enabling spamming)<br><br>No control on adding new users<br>can be from any system<br>no consistent naming method | Sender identity always certain (no spamming)<br><br>Controlled<br>Closed loop<br>Consistent |
| Email composition | Must have Sender email address (explicit / implicit)<br>Must have Receiver email address (explicit / implicit)<br>Optional Cc, Bcc receiver email address (explicit / implicit)<br>Subject/Message Body<br>Accept Attachments | NO<br>NO<br>NO<br>YES |
| Delivery/Receiving Method | Requires DNS name servers to locate a receiver<br><br>Typically have Push - Push- Pull processes | No (always in the same systems)<br>Only Push/Push or Push/Pull process |
| Benefits | messages from inside the entity<br>messages from unpredictable sources (facilitating spamming, virus spreading, ad-ware, breaks/leaks/holes) | YES<br>NO |

FIG. 3D

COLLABORATIVE COMMUNICATION PLATFORMS

BACKGROUND OF THE INVENTION

1. Field of the Invention

The present invention is related to the area of computer-facilitated communications over networks, and more particularly related to techniques for providing a collaborative platform that includes one or more messaging environments, in each of which users interested in one or more subjects can communicate by way of instant messaging, file sharing, electronic mailing, and remote screen capturing, wherein the collaborative platform is designed to be non-intrusive in view of other communication systems available today.

2. Description of the Related Art

The Internet is a data communication network of interconnected computers and computer networks around the world and has been rapidly evolving to the point where it combines elements of telecommunications, computing, broadcasting, publishing, commerce, and information services into a revolutionary new business infrastructure. The economy on the Internet is growing in every aspect of life, a wide range of businesses including stock trading, commodities, products, and services ordering are all via the Internet.

A modern enterprise operates largely on the ability to quickly share information or respond to changing information via the Internet. Electronic messaging systems such as email and instant messaging have provided convenient tools for contacting or keeping in touch with people or groups of people efficiently. These systems provide fast and inexpensive means for individuals to communicate and collaborate. Reliance on the electronic communication has increased even more remarkably with the globalization and trend of outsourcing. As technology advances, it is certain that organizations, large or small, will become more dependent on the electronic messaging systems to excel in a competitive environment.

One popular type of electronic messaging systems is electronic mail or simply email that facilitates users to carry on "conversations" with other computer users. Although Internet telephony allows actual real-time voice conversations, email ensures guaranteed delivery of messages even if one side is not currently present (i.e., online). For users interested in a subject or working on a related project, email provides collaborative means to share ideas and data, and for discussion so as to keep all in a loop. However, one of the unwanted features with the email systems is Spam that is unsolicited email messages. Spammers typically send a piece of email in millions to a distribution list of email addresses, expecting that some of the readers will respond to the email. It is reported that some email accounts could receive thousands of unwanted email in a day. Spam has become a major problem for all Internet users.

In addition, unwanted or expected email with attachments, large or small, as file sharing are often received from co-workers or known individuals. Although such email with attachments is not considered as a Spam, they nevertheless take up a significant portion of the bandwidth of a network and could choke the network when the size of the email is enormous, resulting in a negative impact on the operation and efficiency of the network. Many enterprises have to implement a policy to prohibit company wise distributions of large email.

To keep communications private among those sharing common interest, instant messaging (sometimes called IM) is getting popular and quickly becoming another preferable communication tool to complement the email. IM provides a mechanism to easily see whether chosen friends or co-workers are connected to the Internet and, if they are, to exchange messages with them in real time. Instant messaging differs from the ordinary email in the immediacy of the message exchange and also makes a continued exchange simpler than sending email back and forth. However, unlike email, the IM requires that all communicating parties must be present before an IM session can take place. The IM also restricts file sharing among the parties, although a peer-to-peer IM session allows file transferring between two parties.

What a modern enterprise desires is a true collaborative environment in which co-workers or individuals involved can share information and data, and participate discussion confidentially without intrusions from others, regardless where they are and in what time zone. Email and IM each provide some features desired for a true collaborative environment but none offers all. The present invention discloses a collaborative platform that facilitates such requirements. Besides providing a non-intrusive communication platform, the present invention also provides data mobility to users.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

The present invention provides a true collaborative communication platform that allows users registered with the system to communicate with each other without intrusion from others outside the system. The collaborative communication system contemplated in the present invention integrates a number of electronic communication tools to meet the collaborative communication needs for an enterprise, family members or friends. All communications are within the system. External communications such as email spamming would not intrude the system.

According to one aspect of the present invention, registered users in the system are provided public, group and private arenas or domains. Depending on the privacy, communications with others may be conducted in any one of these domains. The public domain may be configured to show a list of representations for all registered users. The representations may be photo images, specially colored icons or names of the users to facilitate selections of users for communications.

According to another aspect of the present invention, communications with other users in the system can be conducted through electronic internal mail (herein "i-mail"), instant messaging and file sharing. In particular, the i-mail operates on identifiers pertaining to registered users, all email messages by the i-mail are delivered not based on the traditional email addresses but on the identifiers, thus eliminating the possibility of the registered users receiving unwanted email from other users outside the system.

According to still another aspect of the present invention is file lists respectively in the public, group and private domains. These file lists provide bulletin board functions to list files available for downloading whenever needed, essentially eliminating the simultaneous wide distribution of an email message with attachments of the files to all concerned.

The present invention may be implemented in software, hardware or a combination of both and practiced as systems, processes, or methods. One of the objects, features, and advantages of the present invention is to provide a non-intrusive collaborative communication system that facilitate all types of communications, either online or offline, within registered users.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIG. 2C shows a configuration in which there are three stores that may be allocated as part of a network storage space or distributed on a network;

FIG. 3B illustrates a diagram of the prior art email system in which each of the users on a network is assigned an email address;

FIG. 3B shows a close communication loop formed by three of the five users in the i-mail system, wherein the three users can communicate among themselves but can not be contacted by others;

FIG. 3D shows comparisons between a commonly used email tool and one embodiment of the i-mail;

DETAILED DESCRIPTION OF THE PREFERRED EMBODIMENTS

The present invention pertains to processes, systems, architectures and software products for a collaborative communication suite, platform or system. The collaborative communication system contemplated in the present invention integrates a number of electronic communication tools to meet the collaborative communication needs for an enterprise, family members or friends. All communications are within the system. External communications such as email spamming would not intrude the system.

According to one aspect of the present invention, registered users in the system are provided public, group and private arenas or domains. Depending on the privacy, communications with others may be conducted in any one of these domains. According to another aspect of the present invention, communications with others can be conducted through electronic internal mail (herein "i-mail"), instant messaging and file sharing. In particular, the i-mail operates on identifiers pertaining to registered users, all email messages by the i-mail are delivered not based on the traditional email addresses but on the identifiers, thus eliminating the possibility of the registered users receiving unwanted email from other users outside the system. According to still another aspect of the present invention, respective file lists respectively in the public, group and private domains. These file lists provide bulletin board functions to allow files for downloading from a store whenever needed, essentially eliminate the simultaneous wide distribution of an email message with attachments to all concerned. Other aspects of the present invention may be appreciated in the detailed description provided herein.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1A:
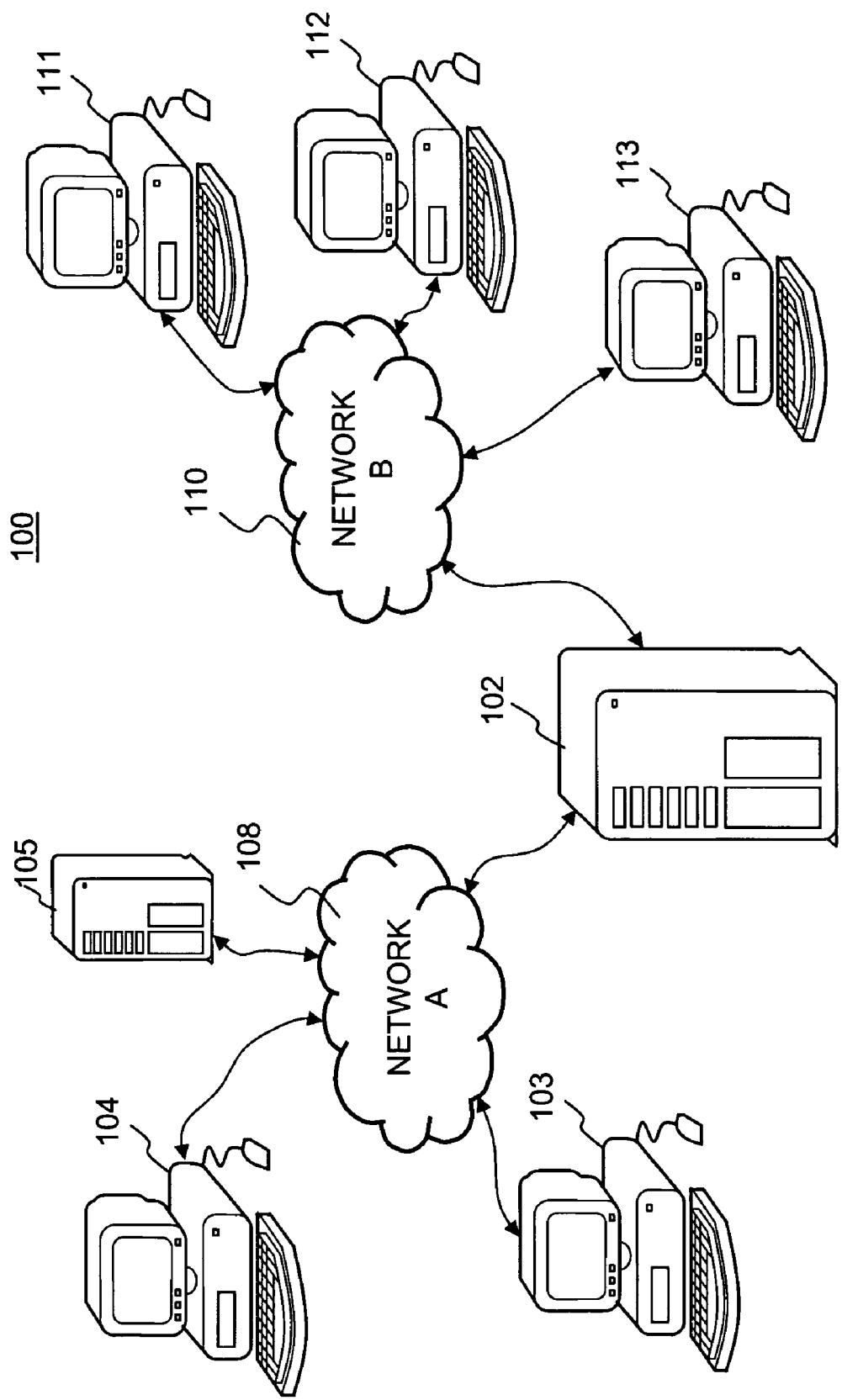
FIG. 1A shows a basic system configuration in which the present invention may be practiced in accordance with one embodiment thereof.

Referring now to the drawings, in which like numerals refer to like parts throughout the several views. FIG. 1A shows a basic system configuration 100 in which the present invention may be practiced in accordance with one embodiment thereof. There are a plurality of computing machines (only 102-105 are shown) coupled to a network 108 that may be a public or a private network (e.g., the Internet or a local area network). The configuration may represent an enterprise environment, large or small, in which users of the machines may be working on different tasks or share a common interest or interests. Each of the machines 102-105 operates independently from others but may provide one or more resources that other machines may need to accomplish a task.

Machines 111-113 are coupled to a network 110 that may be the same as the network 108 or a different network. A server 102 couples the networks 108 and 110 and facilitates communications between the two networks. In one exemplary configuration, the networks 108 and 110 represent two locations. In another exemplary configuration, the networks 108 and 110 represent two different networks (e.g., one is a wired network and the other is a wireless network), in still another exemplary configuration, the networks 108 and 110 represent multiple enterprises that are working on a collaborative project or something that makes it necessary to be connected. In yet still another exemplary configuration, the networks 108 and 110 are part of a global network that facilitates communications among millions of computing devices coupled to the global network.

To facilitate understanding of the present invention without loss of generality, the following description will be based on communication between or among users sharing a common interest. The users may be local or remote with respect to each other, and may be serviced by a different Internet service provider. The common interest means any subject or purpose that is of interest to some or all of the participants in the communication. As one of the aspects of the present invention, a collaborative platform is provided to facilitate such communications among some participants sharing a common interest. Accordingly, these participants may form a communication or working group that excludes other. For example, users with the machines 103, 104 and 111 may be working on a project A and thus form a communication group A. Likewise, users with the machines 103 and 112 may be discussing a subject B and thus form a communication group B. All together, users in the configuration 100 are interested in discussing something interesting to everyone and thus form a communication group C. Each of the communication groups (e.g., A, B and C) may be configured to be fixed, permitting authorized users communicating with each other, or flexible, permitting other users to join if permitted.

According to one embodiment of the present invention, the communication groups are managed by a collaboration server or simply a server herein. Any one of the machines in FIG. 1A may be configured to be a dedicated server or a client as well as a server. To facilitate the description of the present invention, it is assumed herein that the machine 105 is the server. As will be further described below, the server 105 manages information flow among the participants in each of the communication groups. In addition, the server 105 can be configured to retain a copy of the information flow, for example, to facilitate a late-joined participant to catch up what has been discussed or shared among the participants.

Figure 1B:
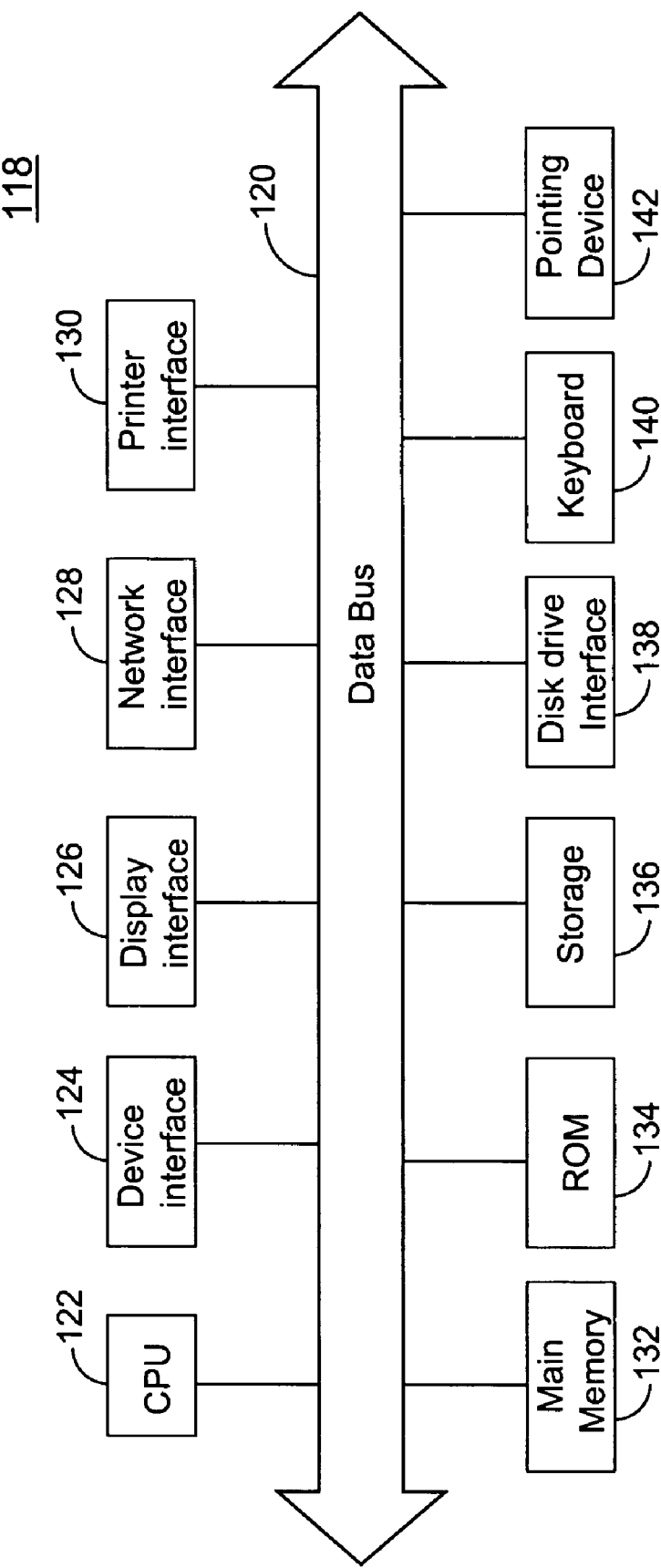
FIG. 1B shows exemplary internal construction blocks of a system in which the present invention may be implemented and executed.

FIG. 1B shows exemplary internal construction blocks of a system 118 in which the present invention may be implemented and executed. The system 118 may correspond to one of the machines shown in FIG. 1A. As shown in FIG. 1B, the system 118 includes a central processing unit (CPU) 122 interfaced to a data bus 120 and a device interface 124. The CPU 122 executes certain instructions to manage all devices and interfaces coupled to data bus 120 for synchronized operations and the device interface 124 may be coupled to an external device such as another computing machine hence one or more resources in the computing machine may be utilized. Also interfaced to the data bus 120 is a display interface 126, a network interface 128, a printer interface 130 and a disk drive interface 138. Generally, a compiled and linked version or an executable version of one embodiment of the present invention is loaded into the storage 136 through the disk drive interface 138, the network interface 128, the device interface 124 or other interfaces coupled to the data bus 120.

The main memory 132 such as random access memory (RAM) is also interfaced to the data bus 120 to provide the CPU 122 with the instructions and access to memory storage 136 for data and other instructions, applications or services. In particular, when executing stored application program instructions, such as the complied and linked version of the present invention, the CPU 122 is caused to manipulate the data to achieve results contemplated by the present invention. The ROM (read only memory) 134 is provided for storing invariant instruction sequences such as a basic input/output operation system (BIOS) for operation of the keyboard 140, the display 126 and the pointing device 142, if there is any. In general, the system 118 is coupled to a network and configured to provide one or more resources to be shared with or executed by another system on the network or simply as an interface to receive data and instructions from a human being.

According to one embodiment, a server module is loaded and executed in a machine (e.g., the machine 105 of FIG. 1A) to manage various communications among client machines (e.g., the machines 104 and 113 in FIG. 1A), each of the client machines is loaded with a client module implementing one embodiment of the present invention. When the client module implementing in a machine is executed on a client machine, a screen display is displayed on the client machine to facilitate a user to manage communications with others. As used herein, a screen display or display means a portion or all of what is being displayed on a display screen that is a physical apparatus such as an LCD display screen associated with many types of computing devices. In addition, a machine used herein means a computing device that may include, but not be limited to, a laptop computer, a desktop computer, a PDA and a cellular phone.

Figure 2A:
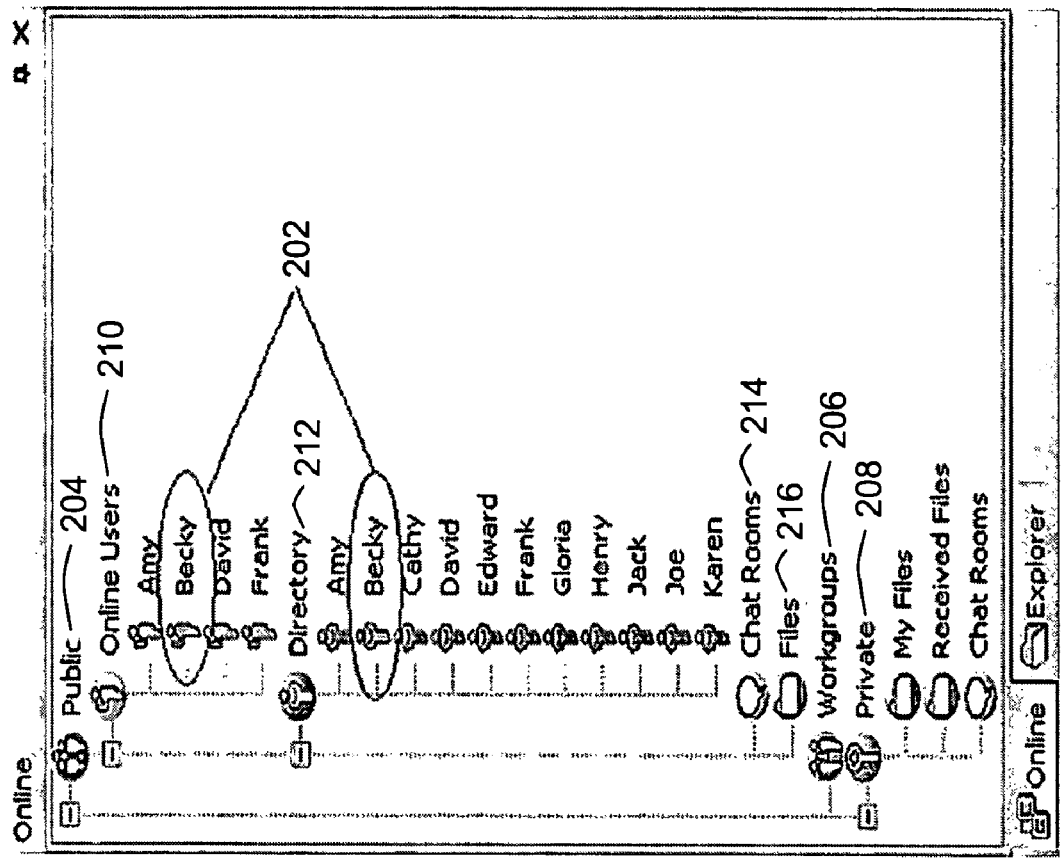
FIG. 2A shows an online panel or a window display of a client machine in accordance with one embodiment.

FIG. 2A shows a communication panel or a window display 200 on a client machine in accordance with one embodiment. In one aspect, the display 200 shows a graphic client environment of the collaborative communication platform contemplated in the present invention. It is assumed that the user has logged into the collaboration system (e.g., the server) as an authorized or registered user "Becky" 202. As shown in FIG. 2A, there are three domains: Public 204, Workgroup 206 and Private 208. The Public domain 204 is an area where all registered users may go in. The Workgroup domain 206 is an area where only workgroup members can go in. If a user belongs to one or more workgroups, that one workgroup or workgroups will be listed in this domain. For example, there are work groups named after "Marketing" and "Finance" and "Product Development", indicating registered users associated with these groups may join in for group communications. There is no limit as to a number of groups a registered user can participate. The Private domain 208 is an area where only the sign-in registered user can go in. In other words, the display 200 is being displayed on the client machine associated with the user "Becky", thus the Private domain 208 can only be accessed by Becky.

According to one embodiment, there are four categories or sections in the Public domain 204: Online Users 210, Directory 212, Chat Rooms 214 and Files 216. As the name suggests, the Online Users section 210 lists all registered users that are currently online, the Directory section 212 lists all registered users that can be communicated. In other words, the listed users in the Online Users section 210 must be members of the Directory section 212. The Chat Rooms section 216 lists all available public chat rooms, if there is any. Depending on a purpose of a chat room, each chat room may be named after a word or phrase, for example, "Coding" indicating a chat room talking about subjects related to program coding discussions, and "investment" indicating a chat room talking about investment subjects. In any cases, these chat rooms may be participated in by anyone of the registered users in the Directory section 212.

The Files section 216, also referred to as a file list providing indications and listing of any files that are available for downloading by all registered users. It is well known in the prior art email systems, when one of the users desires to share a file with others, each of the other users receives a copy of the file (e.g., as attachment) regardless he or she needs it or not, now or later, and some or all. It is often the case that a file of large size in wide distribution to many email recipients can cause various problems to a network.

Fundamentally different from the prior email systems, the present invention introduces the Files list 216 that serves, in certain respect, as a messenger and an interface of a file repository. In operation, a user of the Public domain 204, for example, an employee in an enterprise, uploads a file from his/her computer to a file repository. The file list now is an interface of the file repository. The file does not go to or is stored in the file list of other registered users so as to avoid the wide distribution of the file across a network. Instead, the file list indicates to those eligible to access, now acting as a messenger, that a file is available for downloading. Thus the uploaded file can be downloaded whenever needed. In one embodiment, a user who uploads a file to a file repository may specify when the downloading of the file is expired. After the expiration, the file can be deleted or made unavailable for downloading by the system, wherein the system means one or more client machines, a server or a combination of both.

Different from shared network storage or directory on a network that allows a user to place a file therein and others to copy from, the file list, as shown as Files section 216 in FIG. 2A, is just a logic interface. The user could never physically access a store behind the file list. It is well known in the art that a commonly shared folder or directory is often recognized with a network path or path, for example, //root/xyz/public which indicates a network storage drive "xyz" is allocated a folder "public". To access the folder, one needs to navigate there by following the path. On the contrary, the user does not have the knowledge as to where a store behind the file list is located on a network in the present invention.

Files section 216 in FIG. 2A is shown as a file list acting as a messenger when a file is available for downloading. The messenger may be configured to produce an alerting message that may be displayed on a client machine. In one embodiment, the alerting message is a system-generated electronic email or instant message to those eligible to access the file in the file list (e.g., Files section 216). In another embodiment, an audio sound is produced so that a user becomes aware that a file is available for sharing. In still another embodiment, the file list shows an updated number, for example, from 4/6 to 5/6, indicating there are six files in the file list of which five files have not been accessed. Without physically reaching a shared directory, users under the Public domain can download the file in the file list whenever there is a need, often in different times, thus alleviating the massive distribution of the file to all users via a network.

Figure 2B:
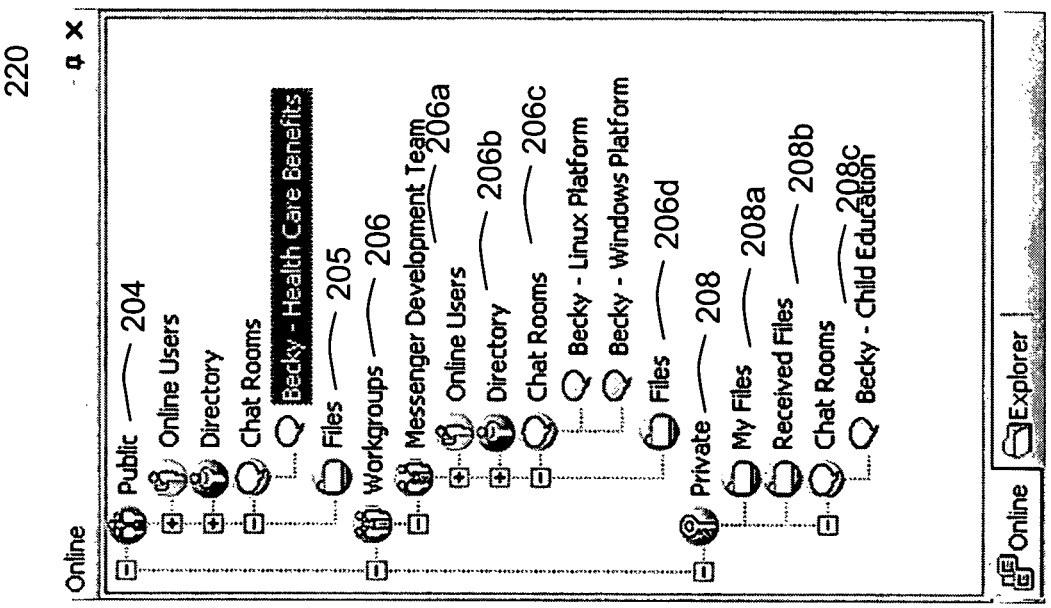
FIG. 2B shows an exemplary user interface or display of a client module implementing one embodiment of the present invention.

Similarly, as shown in FIG. 2B, there are also four sections in the Workgroup 206: Online Users 206a, Directory 206b, Chat Rooms 206c and Files 206d. The Online Users section 206a lists only the users in the Workgroup 206 that are currently online, the Directory section 206b lists only the users in the Workgroup 206 that can be communicated with. The Chat Rooms section 206c lists all available chat rooms, if there is any. FIG. 2B shows that there are two chat rooms sponsored by Becky and the themes of the two chat rooms are "Linux Platform" and "Windows Platform". Similar to the Files section 216 for the Public domain 204, the Files section 206d lists all files available for downloading to all users in the Workgroup 206.

Also shown in FIG. 2B is a Private domain 208 that includes three sections; My files 208a, Received files 208b and Chat Rooms 208c. My files 208a is a private file list designated for the exclusive use of a registered user (i.e., the owner, Becky as shown). Instead of carrying files on the go, the user can upload the files that will be needed in other places or other machines to the private file list and retrieve the files in another place or in another computer when connected to the server. For example, a user uploads some files to My files 208a from the machine 104 of FIG. 1A. These files can be available from the machine 112 when the user is logged onto the server from the machine 112. As explained above, again the user is not aware of any network storage or folders on a network, the data is available for exclusive downloading, if desired, by the user as if the data is now locally available.

The Received files 208b is another private file list designated for receiving files sent by others. When a user wants to send one or more files to Becky for her private access, these files will be indicated available in the private file list. In any case, files in either My files 208a or Received files 208b are private to the user and can only be accessed by the user. In either case, any of the files may be deleted by the system when an expiration time comes. The Chat Rooms section 208c lists all available private chat rooms, if there is any.

FIG. 2C shows a configuration 230 in which there are three stores 232, 234 and 236 that may be allocated as part of a network storage space or distributed on a network 238. In a typical example, the stores 232, 234 and 236 are managed by a server, and preferably behind a firewall if maintained in an enterprise. According to one aspect of the present invention, the stores 232, 234 or 236 can not be navigated in accordance with a path, instead a file list or an interface thereto 240, 242 or 244 is simply provided to indicate a logic interface to which a registered user can upload a file or from which a file can be downloaded. The file lists 240, 242 and 244 are typically displayed in a client machine executing the client module.

According to one embodiment of the present invention, each of uploaded files or folders is set for an expiration time or date. When the expiration comes, a file or an entire folder will be automatically deleted so as to keep a file list (especially the public file list 232) organized. Depending on implementation, the expiration can be decided by a user who uploads the file or systematically by the server that all uploaded files have a fixed expiration, for example, 12 hours or 5 business days.

Figure 2D:
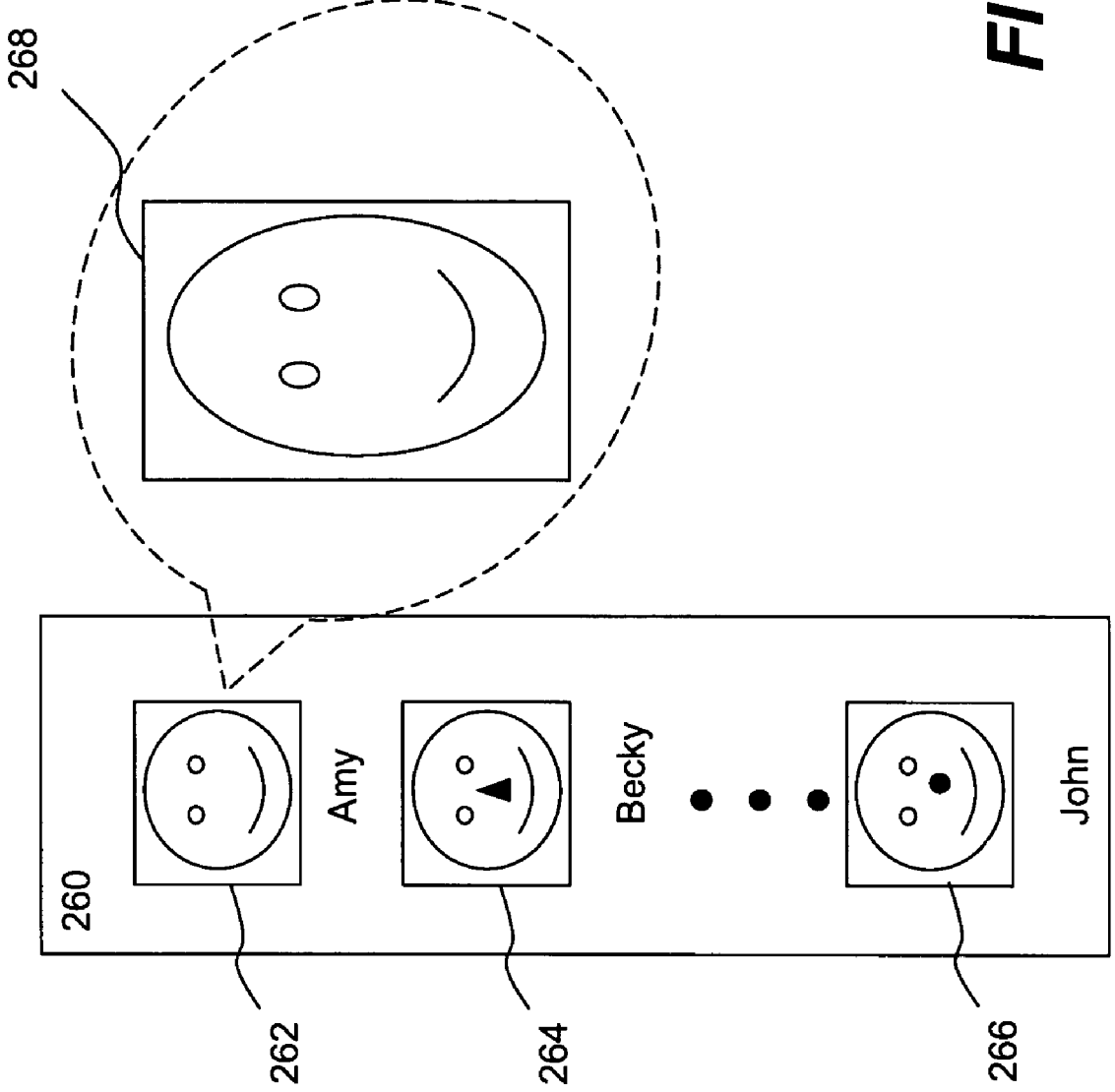
FIG. 2D shows an exemplary of using photo thumbnails images to be associated with registered users.

Return to FIG. 2A, to facilitate the identification of the user him/herself, a thumbnail image of the user or a specially colored icon may be used among thumbnail images or icons for other users. FIG. 2D shows an example of using photo images to associate with the users. A panel 260 may be displayed to include a list of registered users. The panel 260 shows a plurality of photo images, for example, photo images 262, 264 or 266, each indicating a user and, perhaps, being a photo of his or her face. Instead of looking through a list of names or similar icons, the photo images together with corresponding names facilitate a speedy and accurate selection of a user for communication. According to one example, the photo images 262, 264 or 266 are reduced or thumbnail photos. When a mouse is pointed onto or clicked on a thumbnail photo, an enlarged version 268 thereof is displayed to ensure a correct selection is being made. Depending on implementation, the photo images may be set up by the server or uploaded by respective users.

To start chatting with a user, an initiator double clicks the name, a corresponding icon (or a photo image) of the user among all active users under the Online Users section 210. To get contact information about a user, one can double click his or her name or a corresponding icon under the Directory section 212. A user may change his/her own profile by double clicking the corresponding name or icon under the Directory section 212 where the sign-in name, password and contact information may be managed or updated.

It should be noted that FIG. 2A shows only one exemplary online panel. Other forms of the online panel may be implemented. For example, the directory 212 and the online user 210 can also show a total number of the registered users and the online users. In the case of FIG. 2A, the numbers may be shown as (11) for the total registered users and (4/11) for the online users. Alternatively, a number of offline users may be shown as well. According to another embodiment, the online section and the online users 210 may be integrated in the directory 212 in which those that are online are specially indicated (e.g., using a different color, a different icon or superimposing a sign thereon).

One of the advantages about email systems, as opposed to online chatting, is the ability to communicate to others that are not on line. However, the prior art email systems suffers from unsolicited email as well as security issues. Once an email address of a user is obtained, anyone can send whatever to that email address regardless the user wants it or not. Worse, an inbox of the user could be filled with so many unwanted messages that bury a desired message. Not only is the bandwidth of a network wasted, the productivity of the user is significantly impacted.

According to one aspect of the present invention, as part of the collaborative system, an internal email or "i-mail" is provided. One of the advantages of the i-mail is that no other but the registered users may communicate with each other. Unlike the prior art email systems that operate on email addresses, such as john@aol.com, i-mail relies on an identifier of a user, an exemplary identifier is 8723" that is associated with "john", wherein "john" is for recognition by all registered users and "8723" is for the server to route messages properly to the right recipient. In order words, the prior art email systems do not require users to be registered with a (central) server, and instead allow email exchanges between the users via a Domain Name System (DNS) for digesting the email address.

In contrast, the i-mail limits email exchanges within registered users served by a server. Given an identifier, such as "john" or "8723", it is known to those skilled in the art that no messages originated outside the collaborative platform could reach any of the registered users of the collaborative platform even if the identifier is leaked to and abused by other than the registered users.

Figure 3A:
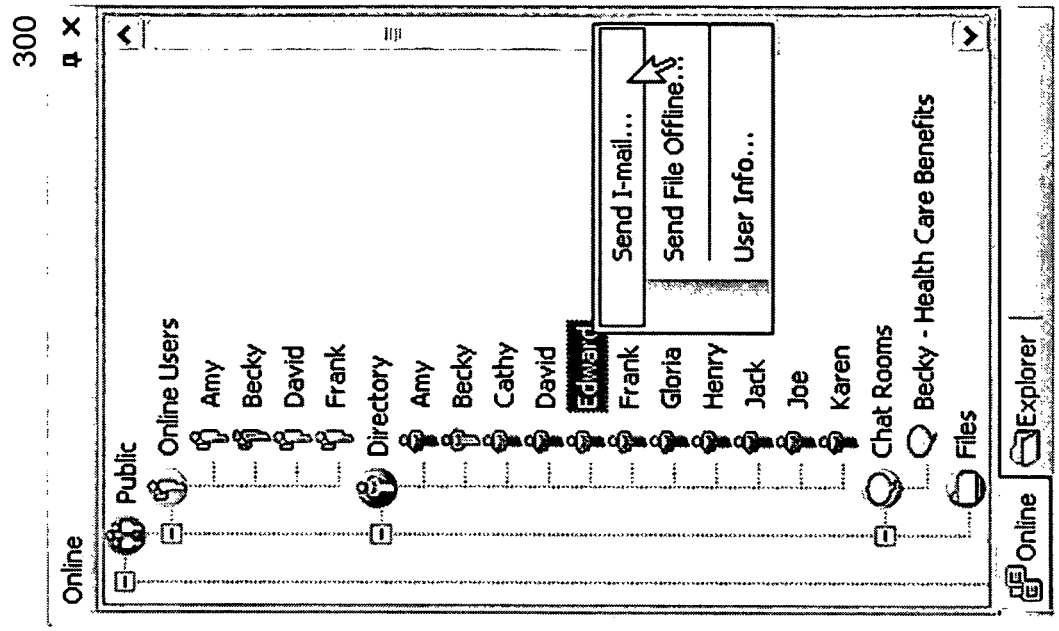
FIG. 3A shows a launch of i-mail by selecting a recipient under the Online Users or Directory in the Public domain or Workgroup domain.

FIG. 3A shows an activation or launch of i-mail by selecting a recipient under the Online Users or Directory in the Public domain or Workgroup domain. For example, if Becky wants to send an i-mail message to Edward, the name "Edward", an icon or photo image thereof may be right-clicked to choose the "Send i-mail" command that leads to a display (not shown) to Becky to compose the email. Most functions in the i-mail, from a user perspective, are substantially similar to those in the prior art email systems (e.g., Microsoft Outlook) and are not to be described further herein. However, as described above, unlike the prior art email systems that are open to everyone, the i-mail is formed with a close loop among all registered users. If there are N registered users, the close loop for the i-mail includes only the N registered users, and only the N registered users can communicate with each other, thus no unwanted email from unregistered users could penetrate into the close loop. It should be noted that N is a finite integer. New users, permitted by the server, can join the collaborative platform at anytime and from anywhere.

FIG. 3B illustrates a diagram of the prior art email system 250 in which each of the users 254-258 on a network 252 is assigned an email address. An email address identifies a user as well as his/her affiliation. For example, john@aol.com means a user named "john" uniquely located with the service provider "America online". When an email message is sent to the email address, a mail server by America online is first located, and a user named "john" is then located for receiving the message. Therefore, each of the users 254-258, regardless of their respective affiliations, can be contacted at his/her email address.

In contrast, FIG. 3C shows a close communication loop 262 formed by three of the five users 255, 256 and 258 in the i-mail system. These three users 255, 256 and 258 can communicate among themselves but can not be contacted by others, for example, users 254 and 257 in the collaborative communication platform contemplated in the present invention. As described above, these three users 255, 256 and 258 are registered users in the collaborative communication platform and assigned respectively an identifier, such as 8823, 8825, and 8892 for the three users 255, 256 and 258. In other words, the identifier is not necessarily an email address, providing no clue of who the user may be and which organization (or mail server) the user may be affiliated with.

Although the identifier itself is not necessarily limited to non-email address, even if an email address is used as an identifier, such identifier is not used for what an email address is supposed to be used. In other words, the i-mail does not need to locate an email server by an email address to deliver an email message. In fact, an i-mail message never goes out of the system and an email address is of no use at all in delivering an i-mail message. As a result, no unwanted email messages or Spam from other than the three users 255, 256 and 258 are possible to penetrate into the i-mail system.

To better understand the differences between the prior art email and the i-mail contemplated in the present invention, FIG. 3D shows comparisons between a commonly used email tool and one embodiment of the i-mail. The differences may be appreciated from at least five different aspects. First, an account set-up procedure in email involves determinations of name display (e.g., John Smith, jsmith or, John), an email address (e.g. john@abc.com), a server type (POP3, IMAP, HTTP), a server name, and corresponding account name and password on the server. As shown in FIG. 3D and described above and further below, the i-mail does not operate on the typical email address and use the commonly used email prototype. Because all communications can only be conducted with a collaborative communication system, no messages would be going out and routed through email servers on the way to a recipient, the i-mail does not use the typical email address and the commonly used email prototype for email communications between sending or receiving parties.

Second, there is a significant question regarding the identity of an email sender. In the prior art email that is, in one perspective, built on the concept of the postal system, anyone can send any (e)mail to any one as long as there is a legitimate (e)mail address. Therefore the identity of an email sender can not be known in advance, thus providing opportunities of receiving unwanted email, spamming or virus spreading. In contrast, the i-mail, in one perspective, built on the concept of internal or intra-departmental system, operates on a close loop of registered users, the identities of all email senders are known, no email messages from outside of the system would penetrate into the system. Further, the prior art email has no control on adding new users and naming users, thus allowing an illicit user to impersonate a known user for sending an unwanted (often harmful) message. Evidently, such activities would never happen in the i-mail given the underlying designs.

Third, regarding the difference in email composition, the prior art email always requires email addresses of either a sender and a receiver so that an email can be properly routed to the sender and replied, the i-mail does not require the email addresses.

Fourth, when an email message is sent out, one or more Domain Name Servers are needed to determine an email server for the recipient in the prior art email. Since the i-mail operates within all registered users, no email messages would go out of the system and neither DNS servers would be needed. In addition, it is well known that a common process of sending and receiving an email message in the prior art email is what is referred to as Push-Push-Pull process. Namely, a composed email is pushed from a client machine to an email server for the sender, the email server then pushes the email to an email server for the recipient. The email is then pulled from the email server by a client machine of the recipient. In contrast, the i-mail does not have Push-Push-Pull. In one embodiment, an i-mail message is pushed from a client machine to a server that immediately pushes the email to the recipient online or allows the recipient to pull the email in a mail inbox from the server when needed.

Fifth, although the prior art email allows messages to be communicated within co-workers, the underling mechanism possesses the openness that allows messages from unpredictable sources, thus facilitating spamming, virus spreading, ad-ware, breaks/leaks/holes. As described above, the i-mail operates on a closed loop of registered users, such undesirable byproducts or features from the prior art email systems would not happen in the i-mail.

Another aspect of the present invention is to send one or more files to a file list that may be public, semi-public or private. Instead of widely spreading a file as an attachment to a group of users via email, the file list, as the name suggests, serves as a bulletin board to announce what files are available for a user, users in a workgroup or all registered users. Instead of sharing a file instantly with all users, the file list provides a logic interface from which a user can download one or more available files when needed. Referring back to FIG. 2B, the files 205 is a public file list, any registered users in the directory under the public 204 may access the public file list by uploading or downloading any file. Similarly, the files 206d of FIG. 2B is a semi-public file list, only registered users in the directory under the group 206 may access the file repository 206d by uploading or downloading any file.

Under the private 208, there are, however, two types of file lists, my files 208a and received files 208b. The my files 208a is allocated for sole access by the user associated with the private 208. The user can upload certain files to a store via the private file list (e.g., my files 208a) and download them from another location or another computing device, which provides enormous mobility of data or files used by the user. The received file 208b is also a file list that can be only accessed by the user. In some cases, instead of sending a file as an attachment to the user, another user can upload the file that is shown in the received files 208b associated with the user, which provides the flexibility of when and how to access the file by the user.

FIG. 2C shows three different types of file lists, a public file list 240, a semi-public file list 242, and a private list 244. Each of the lists 240, 242, and 244 are respectively coupled to a store 232, 234, or 236. The stores 232, 234, and 236 may be a storage space on a network 238. As described above, a network storage currently used in an enterprise is identified by a path and can be accessed by the path within the enterprise. In contrast, the stores 232, 234, and 236 coupled to the network 238 are not identified by a path, thus can not be navigated by users and can only be accessed through the file lists 240, 242 and 244. As the file lists 240, 242 and 244 are provided in the client module, they can be respectively accessed by corresponding users from anywhere at any time.

According to one embodiment, the file lists 240, 242 and 244 are closely managed by the server to ensure that accessibility of the file lists 240, 242 and 244 is in accordance with its corresponding classification (i.e., public, semi-public and private). Depending on implementation, the respective connections between the file lists 240, 242 and 244 and the stores 232, 234, and 236 may be established over a virtual private network (VPN) or by secured channels (e.g., encryption).

When a file is uploaded to a file list, a user is offered to determine when the file is no longer available for downloading, which facilitates the management of these file lists, especially those public or semi-public file lists, to prevent prolonged stay of unnecessary files therein. In one embodiment, the user is offered a display window when a file is uploaded to a file list. The display window shows a set of predetermined times for the user to select a time or set up a time to expire the uploaded file. In another embodiment, the system automatically sets up an expiration time for an uploaded file, for example, 7 days. After the expiration, the file is automatically deleted or made unavailable for further downloading. It should be noted that the description above about the file lists is based on a file, those skilled in the art could appreciate that this aspect of the present invention is equally applied to a folder including multiple files.

Another aspect of the present invention is to enable local and remote screen capture functions. The local screen capture enables a user to electronically capture one ore more screen displays off a display screen used by another user. The captured display as an image can be saved for many applications such as system support, project collaboration and employee internet access management. Depending on implementation or particular setting, the remote capture may be controlled in accordance with various permission configurations. One exemplary permission configuration that may be deployed in an enterprise is to have a rank based permission that allow a higher-ranked user to remote capture a screen display of a lower-ranked user. Another exemplary permission configuration is to allow everyone in a workgroup to remote capture a screen display of each other.

Figure 4C:
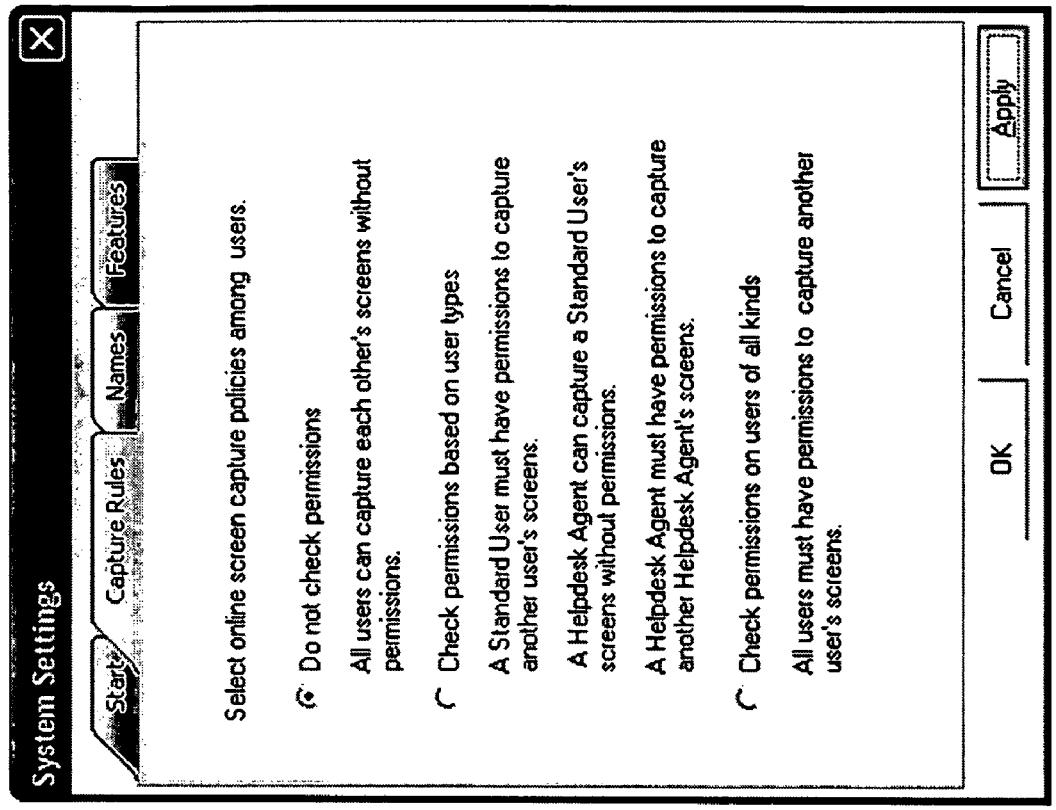
FIG. 4C shows an exemplary display when the communication platform is installed to allow a system administrator to configure the permissions.
Figure 4A:
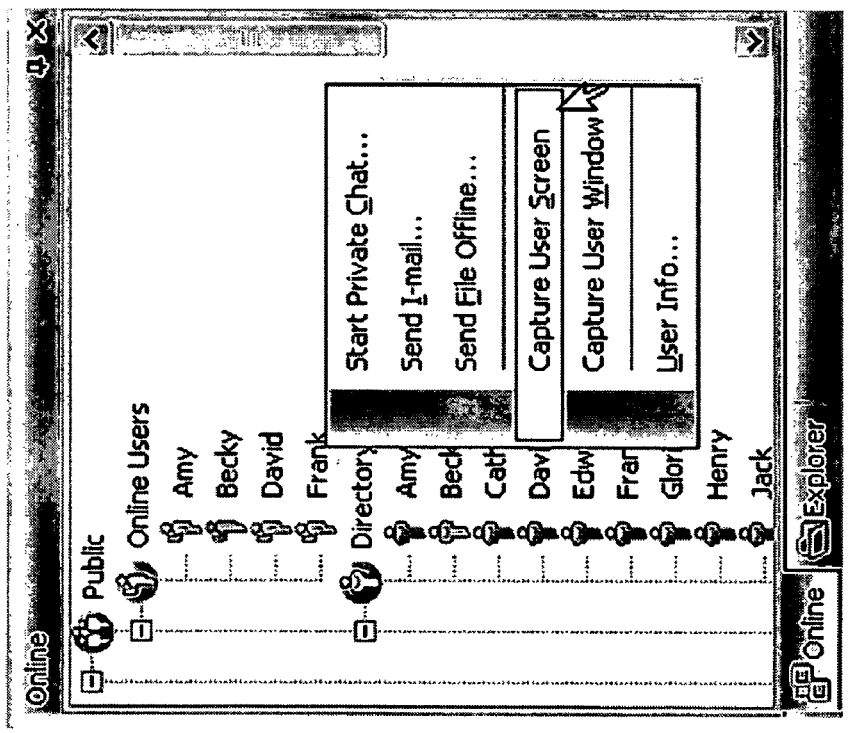
FIG. 4A shows an exemplary display of choosing a user and initiating a communication request.

To capture a display screen of a registered user named "Frank", as shown in FIG. 4A, the name in the Online Users section is selected, a list of commands is displayed, perhaps by right clicking a mouse button, wherein a command "Capture User Screen" or "Capture User Window" is activated. As a result, whatever being displayed in a client machine used by Frank will be captured with or without notifying Frank, the image is then delivered to the user that requested the capture.

In one embodiment, the client module running on a client machine is embedded with a screen capturing module. One exemplary screen capturing module is provided by Inbit incorporated having a business address 1340 South De Anza Boulevard, Suite 202, San Jose, Calif. 95129, U.S.A. Whenever the screen capturing module is triggered by a local or remote command, a display, either a whole screen or an active window, is captured.

Figure 4B:
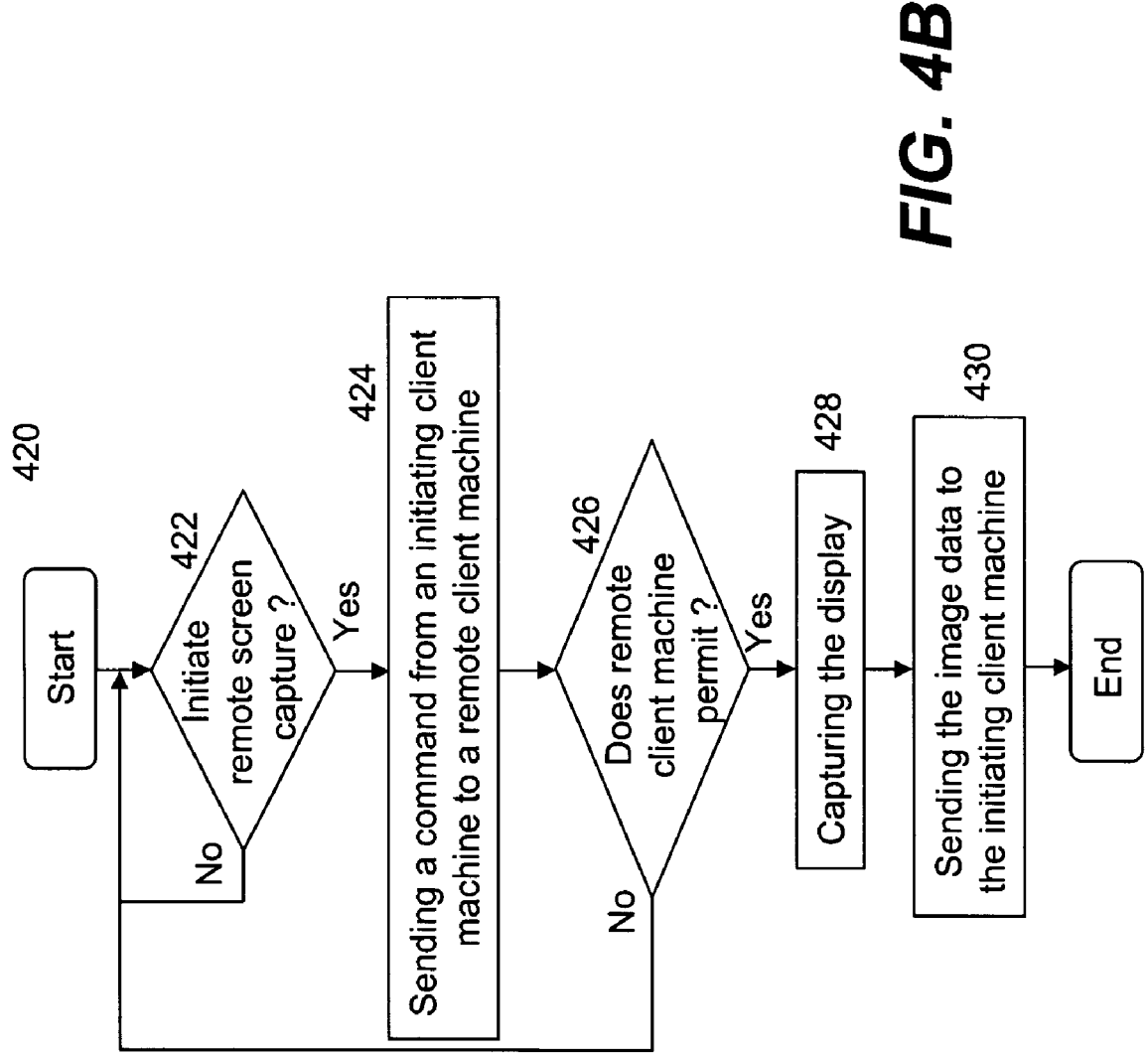
FIG. 4B shows a flowchart or process of capturing a remote display.

FIG. 4B shows a flowchart or process 420 of capturing a remote display. The process 420 is initiated when a first user wants to capture a display of a remote machine by a second client. One exemplary scenario is that the first user is supporting the second user by checking out the status of what is going on with the machine being used by the second user. Another exemplary scenario is to facilitate an organization to monitor what the remote machine is doing, in which case, the captured image may be achieved.

As described above, the second user is identified and chosen by the first user from the Online users, indicating that the second user is logged on. At 422, the process 420 awaits what the first user wants to do with the second user (e.g., i-mail to, chatting with and uploading a file to the second user). It is assumed that the first user wants to capture a display on the remote machine being used by the second user.

The process 420 moves to 424, wherein a capturing command is generated and sent across a network to the remote machine. In general, the command includes a first address identifier identifying the client machine being used by the first user, a second address identifier identifying the remote machine being used by the second user, parameters pertaining to whether to capture an entire display of the screen, an active display of the screen or a top-most window. At the 426, the command arrives at the remote machine and is judged in accordance with permissions set up by the second user or by the server. If the permission configuration at the remote machine does not allow such capture, the process 420 goes back to 422. In some cases, the permission configuration may allow only a regional screen capture or pop up a warning to the second user that someone is capturing the screen display.

FIG. 4C shows an exemplary display when the communication platform is installed to allow a system administrator to configure the permissions. Depending on actual deployment of the platform, the permission configurations may include, but not be limited to, that 1. any registered user can capture another registered user's screens without permission;
2. users are classified, higher rank users can capture lower rank users' screens without permission, but same rank users must have permissions to capture another user's screens;
3. all users must have permissions to capture another user's screen;
4. permission is granted by dragging a user to a permission list on the client side; and
5. server Administrator may set an option to decide if a user should be notified when his/her screen is captured by another user.

In any case, it is assumed that the permission configuration allow such capture, the command triggers a screen capturing module in the remote client machine. The screen capturing module activates to capture the display without causing any attention from the second user at 428. The captured image is then sent to the first user at 430.

Figure 5:
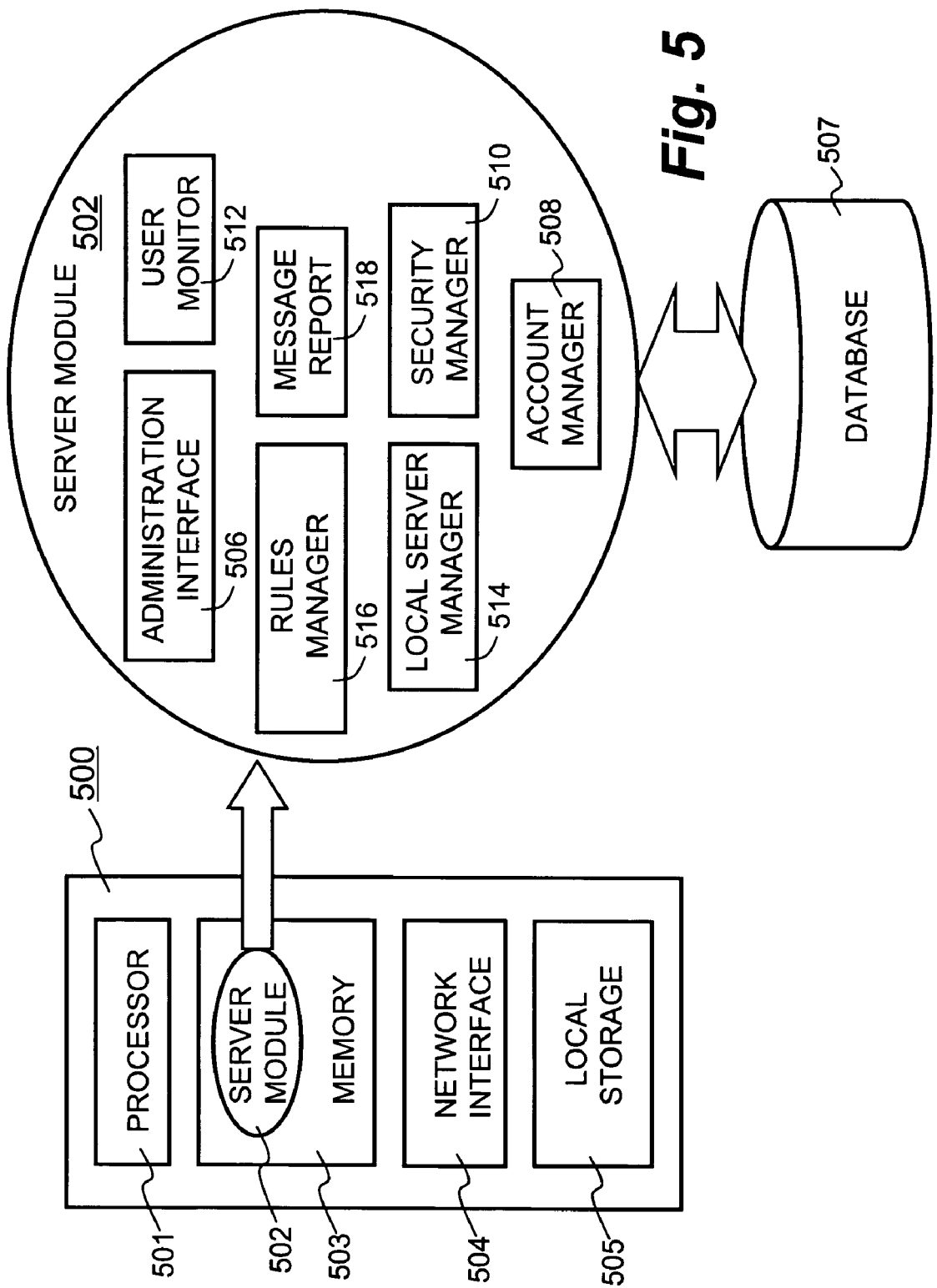
FIG. 5 shows a functional block diagram of a server device in which a server module resides in a memory space and is executable by one or more processors.

Referring now to FIG. 5, there is shown a functional block diagram of a server device 500 in which a server module 502 resides in a memory space 503 and is executable by one or more processors 501. The server device 500 may be any of the computing devices shown in FIG. 1A. The server device 500 includes a network interface 504 to facilitate the communication between the server device 500 and other devices on a network and a storage space 505. The server module 502 is an executable version of one embodiment of the present invention and delivers, when executed, features/results contemplated in the present invention.

According to one embodiment, the server module 502 comprises an administration interface 506, an account manager 508, a security manager 510, a user monitor 512, a local server manager 514, a partner access manager 516, an access report manager 518, and a rules manager 520.

Administration Interface 506:

As the name suggests, the administration interface 506 facilitates a system administrator to register users and grant respective access privileges to the users and is an entry point to the server module from which all sub-modules or the results thereof can be initiated, updated and managed. In one embodiment, the system administrator sets up and manages the following processes:

Instant Messaging for Public messaging, Workgroup messaging, and Private messaging;
Chat Rooms including Public chat rooms, Workgroup chat rooms, and Private chat rooms;
Internal Mail (i-mail) sending i-mail to public, sending i-mail to workgroups, and sending i-mail to specified co-workers;
File Sharing for public file lists, and workgroup file lists and file transfer via private file lists; and
Permission based remote screen capture.

Account Manager 508:

Essentially, the account manager is a database or an interface to a database 507 maintaining all the registered users and their respective access privileges. In operation, the account manager 508 authenticates a user when the user logs onto the server 500 and also determines if the user can access a file list. For example, when a user tries to log on to the server, the user is prompted to input confidential signatures (e.g., username and password). The confidential signatures are then verified by the account manager 508. If the confidential signatures are successfully verified, the user is authenticated and now can access the system. In general, the account manager 508 is where an enterprise may be able to control its users.

Security Manager 510:

This module is configured to provide security when needed. When necessary, messages, data or files being shared among registered users may be encrypted thus only authorized user may access the secured messages, data or files. In one embodiment, the user key manager 510 is not activated to retrieve the keys therein. In some situations, an encryption key to a secured file is securely maintained in the module and can be retrieved by the system administrator to access a secured document in case the key in a client machine is corrupted or the user or users who have the access privilege to access the secured document are no longer available. In another embodiment, the module 510 is configured to initiate a secure communication session when it detects that a registered user accesses a file list remotely over an open network.

User Monitor 512:

This module is configured to monitor the status of registered users and generally works in conjunction with the account manager 508. In particular, the user monitors 512 is configured to manage all registered users as a single group, respective user groups, and individual users as private user group so that unauthorized users would not get into a group they are not permitted. In addition, the user monitor 512 is configured to push or deliver related messages, updates, and uploaded files, if there is any, to a registered user.

Local Server Manager 514:

In some cases, a collaborative communication platform needs to collaborate with another collaborative communication platform so that users in one collaborative communication platform can communicate with users in another collaborative communication platform. In this case, a server responsible for managing a collaborative communication platform is referred to as a local server. Accordingly, the local server manager 514 is a module configured to enable more than one local servers to communicate. Essentially, the server 500 in this case would become a central server to coordinate the communication among the local servers.

Rules Manager 516:

This module is primarily used to configure various rules imposed across the system to control communications therein. For example, certain rules are provided to certain users that may capture displays of other client machines without asking for any permission.

Message Report Manager 518:

A module is configured to record or track all messages (e.g., i-mail messages, instant messages, shared files) communicated among registered users or groups of users. These messages are retained for a period of time so that a non-participated user may catch up what was communicated among the users. In one embodiment, certain types of messages are made to be kept for a predefined time in compliance of regulations or retention of evidences. In operation, the message report manager 518 works in conjunction with the database 507 and indexes a retained message for later retrieval. In another embodiment, the message report manager 518 is configured to record all types events that include, but may not be limited to, a time registered user is logged onto and off the system, when an uploaded file or an i-mail message is accessed by a user.

It should be pointed out that the server module 502 in FIG. 5 lists some exemplary modules according to one embodiment of the present invention and not every module in the server module 502 has to be implemented in order to practice the present invention. Those skilled in the art can understand that given the description herein, various combinations of the modules as well as modifications thereof, without departing the spirits of the present invention, may still achieve various desired functions, benefits and advantages contemplated in the present invention.

Figure 6:
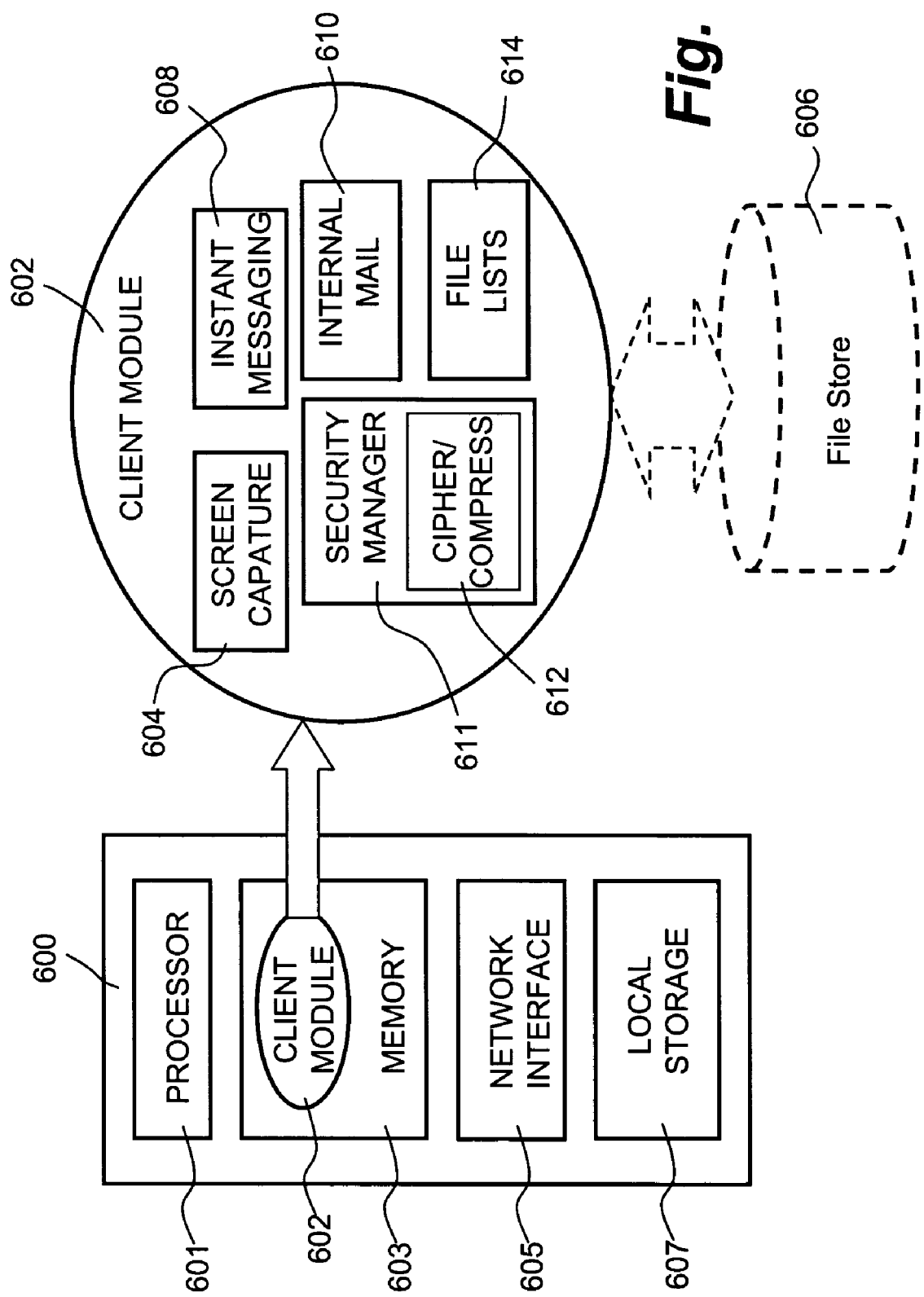
FIG. 6 shows a functional block diagram of a client machine in which a client module resides in a memory space and is executable by one or more processors.

Referring now to FIG. 6, there is shown a functional block diagram of a client machine 600. As used herein, the client machine 600 is a computing device used by a user and may be located anywhere on a network. The client machine 600 can, for example, be a desktop computer, a mobile device or a laptop computer. According to one embodiment, the client machine 600 includes a processor 601, a client module 602, a memory space 603, a network interface 605 and a local store 607. The client module 602 resides in the memory space 603 and, when executed by the processor 601, delivers features, advantages and benefits contemplated in the present invention. Through the network interface 605, the client machine 600 is capable of communicating over a data network with other computers, such as the server 500 of FIG. 5.

In operation, the client module 602 is executed in the client machine 600, a user, after authenticated by the server, can communicate with other registered users in the collaborative communication platform without being interrupted or spammed. All communications (messages/file/data exchanged and email messages delivered via the i-mails) stay in the collaborative communication platform. According to one embodiment, the client module 602 includes a number of sub-modules including a screen capture module 604, an internal mail (i-mail) module 610, an instant messaging manager 608, a security manage 611 and file lists 614.

Screen Capture Module 604:

This module is a software agent configured to capture a display of a computing machine. The software agent is activated by a command and can capture an entire screen display, a regional screen display or a display of an active window. The command may be provided locally or remotely. In the case that the command comes from a remote machine, the screen capture module 604 operates in conjunction with the network interface 605 and transports an image of the captured display to the remote machine. In one embodiment, when the image is to be transferred out of the computing machine, the image may be compressed and/or encrypted by a compression/encryption module 612 to facilitate efficient and/or secured delivery of the image to the remote machine.

Instant Messaging Module 608:

This module facilitates chatting session among two or more registered users. In one embodiment, the instant messaging module 608 is configured to display a notification to a user when the user has received a file uploaded by another user. The file can then be downloaded before an expiration time whenever the user needs it.

Internal Mail Module 610:

This module is responsible for facilitating internal electronic mail exchanges among the registered users. In terms of functions from the user perspective, this module performs similarly as those popularly used such as Microsoft Outlook. The module provides tools to compose, read, forward, and delete an email message.

Security Manage 611:

This module is a counterpart of the module 510 of FIG. 5 and is configured to provide security when needed. In some cases, messages, data or files being shared among registered users may be encrypted thus only authorized user may access the secured messages, data or files. In other cases, the module 510 is configured to initiate a secure communication session with the module 510 in the server when it detects that the user thereof accesses a file list remotely over an open network.

File List Manager 614:

This module manages file lists and ensures that these file lists are interfaced properly with one or more stores managed by the server. In one embodiment, whenever the file list manager 614 detects or is notified that one of the stores has been uploaded a file, an alerting message is sent to those who are supposed to access the file. In addition, the file list manager 614 may be configured to provide a set of rules as to what files may be provided for other users to share or how long an uploaded file may be retained for downloading.

It should be pointed out that the client module 602 in FIG. 6 lists some exemplary sub-modules according to one embodiment of the present invention and not every module in the server module 602 has to be implemented in order to practice the present invention. Those skilled in the art can understand that given the description herein, various combinations of the sub-modules, may achieve certain functions, benefits and advantages contemplated in the present invention.

There are numerous functions, benefits and advantages in the present invention. One of them is that the present invention provides a true collaborative communication platform that allows users registered with the system to communicate with each other without intrusion from others outside the system. Another one of the functions, benefits and advantages of the present invention is the i-mail that operates on identifiers pertaining to the registered, respectively, all internal email are delivered not based on the traditional email addresses but on the identifiers. Still another one of the functions, benefits and advantages of the present invention is the file lists that eliminate the simultaneous wide distribution of an email message with attachments to all concerned, and instead provides a list function to allow files for downloading whenever needed. Still another one of the functions, benefits and advantages of the present invention is the remote screen capture function that allows one user to capture a display screen of another remotely. Yet still another one of the functions, benefits and advantages of the present invention is the security inherently provided in the system as the system operates on a closed loop of registered users, where new users can join anytime with permission. Other functions, benefits and advantages are apparent to those skilled in the art given the detailed description herein.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. For example, the client module may be executed on a server and accessible from an internet browser executing on a client machine. For example, the client displays FIG. 2A, FIG. 2B and FIG. 3A may be displayed in a browser. Accordingly, the scope of the present invention is defined by the appended claims rather than the foregoing description of embodiments.

We claim:

1. A system for providing a collaborative communication platform, the system comprising:
   a server executing a server module stored in memory, configured to manage all types of communications in the collaborative communication platform including a message recording mechanism, the all types of communications including at least live chatting by instant messaging, and internal electronic mail (hereinafter "i-mail") going through the server, the message recording mechanism activated to archive messages exchanged in the live chatting and in the i-mail, wherein the all types of communications happen only among users registered with the server; and
   at least a first client machine and a second client machine, each of the client machines displaying a user interface, wherein the user interface displays a first section showing all of the users registered with the server, the all types of communications happen only among the users via the server, any data in the live chatting and the i-mail being transported by the server between the first client machine and the second client machine, wherein composition of an i-mail message requires no email addresses of a sender and a recipient of the i-mail message, the i-mail message is delivered to the recipient based on a Push-and-Push or Push-and-Pull process within the collaborative communication platform; and
   wherein a first user of the first client machine sends an i-mail message to one of the registered users, the i-mail message is a formatted electronic message including a subject and a message body; or
   wherein a first user of the first client machine communicates with a second user of the second client machine by the live chatting, and wherein both of the first and second users are listed in a second section listing some of the users online.

2. The system of claim 1, wherein the first client machine and the second client machine are coupled to a network but not necessarily in an enterprise premise.

3. The system of claim 2, wherein each of the first user and the second user is identified by an identifier in the collaborative communication platform, the identifier is assigned by the server and can not be used as an email address for someone other than the registered users to send an email message to.

4. The system of claim 3, wherein each of the first user and the second user is allocated a private domain in the user interface, and wherein the private domain includes a file list allowing a file to be uploaded from one machine and accessed from another machine.

5. The system of claim 4, wherein the user interface further includes another file list in the private domain to show that a file has been delivered by the first user for private access by the second user, and wherein the file is never actually in the second client machine till the second user decides to download the file.

6. The system of claim 5, wherein the second user is alerted by a text message when the file is uploaded by the first user to the another file list.

7. The system of claim 6, wherein the file uploaded in the another file list has an expiration and will be no longer available to the second user when the expiration comes.

8. The system of claim 4, wherein the user interface further includes a chat room section in the private domain to host a number of chat rooms, if there is any.

9. The system of claim 3, wherein the first user is alerted by an alerting message when a message is received by the i-mail.

10. The system of claim 9, wherein the message is instantly delivered when the first user is online, or the message is delivered to an inbox of the first user when the first user is offline.

11. The system of claim 3, wherein the first user and the second user share a common interest, and registered in a group that is initiated by one of the first user, and the second user, and wherein the group can be joined by other users, if any, (collectively referred to "third user"), the third user is admitted to the group when permitted by either one of the first user and the second user.

12. The system of claim 11, wherein the group includes a file list accessible only by any of the first user, the second user and the third user.

13. The system of claim 12, wherein each of the first user, the second user and the third user is alerted by a text message when a file is uploaded by one of the three users to the file list.

14. The system of claim 13, wherein the file in the file list has an expiration and will be no longer available when the expiration comes.

15. The system of claim 13, wherein the file list being shown to other two of the three users indicates that the file has been delivered by one of the three users for access only by the two of the three users, and wherein the file is never actually in the client machines by the two of the three users till one of the two of the three users decides to download the file.

16. The system of claim 1, wherein the user interface includes a file list to indicate that a file has been uploaded or is accessible by anyone of the registered users in the first section, the file list is displayed on each of client machines respectively used by the registered users, the file is never actually delivered to the client machines until one of the registered users has decided to access the file by downloading the file.

17. The system of claim 16, wherein an alerting message is sent to each of the registered users when the file is uploaded by one of the registered users to the file list thereof.

18. The system of claim 16, wherein the user interface further includes a chat room section hosting a plurality of chat rooms, each is initiated by one of the registered users and can be participated by any of the other registered users.

19. The system of claim 1, wherein each of users registered with the collaborative communication platform is identified by a unique identifier that can not be used by other than the registered users to send email messages to, the unique identifier being used by any of the registered users to send i-mail messages within the collaborative communication platform.

20. The system of claim 19, wherein all email messages exchanged by the i-mail are guaranteed to be from or to one or more of the registered users.

21. The system of claim 1, wherein the server further includes a rule manager configurable to impose various sets of communication privileges for the registered users.

22. The system of claim 21, wherein some of the registered users are granted permissions to remotely capture a screen display of a client machine without alerting a user of the client machine.

23. The system of claim 1, wherein each of the registered users remotely captures a screen display of a client machine by each of the other registered users should the each of the other registered users permits, and wherein an image of the screen display is forwarded to the each of the registered users.

24. The system of claim 1, wherein the first section shows a plurality of photo images, each of the photo images associated with one of the users.

25. The system of claim 24, wherein, when one of the users is to be contacted, the photo images are browsed to identify the one of the users.

26. The system of claim 25, wherein, when one of the photo images is selected, the one of the photo images is displayed in a larger dimension than that of other of the photo images.

27. The system of claim 25, wherein each of the photo images is updatable by a user thereof.

28. A system for providing a collaborative communication platform, the system comprising:
   a server executing a server module stored in memory, coupled to a network and configured to manage all types of communications in the collaborative communication platform that only supports registered users with the server, each of the registered users being identified by a unique identifier, wherein any of the all types of communications are conducted among the registered users based on the identifier of each of the registered users;
   a plurality of client machines, respectively coupled to the server, each executing a client module to display a user interface, the user interface showing at least a public domain, a group domain, and a private domain, wherein the public domain is open to all registered users, the group domain is open to only those of the registered users invited, and the private domain is accessible exclusively by a registered user who has logged onto the server,
   wherein each of the three domains maintains at least a chat room section hosting chat rooms, if any, and a file list to indicate that a file is available for access upon uploading the file by one of the registered users to the file list thereof, and
   wherein each of the registered users communicates with each of the other registered users by internal email (hereinafter "i-mail") and instant messaging, any data in the i-mail and the instant messaging is transported by the server, and wherein composition of an i-mail message requires no email addresses of a sender and a recipient of the i-mail message, the i-mail message is delivered to the recipient based on a Push-and-Push or Push-and-Pull process.

29. The system of claim 28, wherein the server further includes a retention mechanism recording and indexing respectively all messages exchanged through each of the chat rooms so that, if necessary, any of the recorded and indexed messages can be replayed.

30. The system of claim 28, wherein one of the privileges for the registered users pertains to permission-based screen capture, and, if granted, one of the registered users can remotely capture a display screen of another one of the registered users.

31. The system of claim 30, wherein an image of the captured display screen is delivered across the network to the one of the registered users.

32. The system of claim 31, wherein the image is compressed and/or encrypted.

33. The system of claim 28, wherein the file uploaded by the registered user never goes across the network to the file list of any of the other registered users upon uploading the file by the registered user to the file list thereof.

34. The system of claim 33, wherein the file is time-stamped by the server and becomes unavailable for downloading after a predefined time.

35. The system of claim 34, wherein a secured channel is established when the file is being downloaded to a file list.

36. The system of claim 28, wherein each of the registered users is identified by a unique identifier that can not be used by other than the registered users to send email messages to, the unique identifier being used by any of the registered users to send i-mail messages within the collaborative communication platform, wherein the i-mail message is a formatted electronic message including a subject and a message body.

37. The system of claim 36, wherein all email messages exchanged by the i-mail are guaranteed to be from or to one or more of the registered users.

38. The system of claim 36, wherein composition of the i-mail message requires no email addresses of a sender and a recipient of the i-mail message.

39. The system of claim 36, wherein the i-mail message is delivered to a recipient based on a Push and Push or Push and Pull process.

40. The system of claim 36, the message is instantly delivered when the first user is online, or the message is delivered to an inbox of the first user when the first user is offline.

41. The system of claim 28, wherein some of the registered users are granted permissions to remotely capture a screen display of a client machine without alerting a user of the client machine.

42. A method providing a collaborative communication platform, the method comprising:
   displaying a user interface including a list of representations of users registered with the collaborative communication platform, a group domain and a private domain, each of the domains including at least a chat room section hosting chat rooms, and a file list to indicate what files are available for downloading;
   communicating with each of the registered users by internal email (hereinafter "i-mail") and instant messaging, each of the users being uniquely identified with an identifier that is not used by other than the registered users to send email messages from outside the collaborative communication platform to any of the registered users, wherein any data in the i-mail and the instant messaging is transported by server administrating the collaborative communication platform, and composition of an i-mail message requires no email addresses of a sender and a recipient of the i-mail message, the i-mail message is delivered to the recipient based on a Push-and-Push or Push-and-Pull process; and
   sharing a file deposited on the server with one or more of the registered users, wherein the file is listed in the file list that is accessible by the one or more of the registered users, and upon uploading the file to a store interfaced with the file list, the one or more of the registered users receiving an alerting message.

43. The method of claim 42, wherein each of the representations is associated with a photo image uniquely representing one of the registered users.

44. The method of claim 43, wherein, when one of the registered users is to be contacted, the photo images are browsed to identify the one of the users.

45. The method of claim 44, wherein, when one of the photo images is selected, the one of the photo images is displayed in a larger dimension than that of other of the photo images.

46. The method of claim 44, wherein each of the photo images is updatable by a user thereof.

47. The method of claim 42, wherein the user interface further includes a public domain that also includes at least a chat room section hosting chat rooms, if any, and a file list to indicate what files are available for downloading.

48. The method of claim 47, wherein any files listed in the file list of the public domain can be downloaded by any of the registered users, and any chat rooms in the chat room section can be participated by any of the registered users.

49. The method of claim 42, wherein the identifier is not a traditional email address that includes email server information.

50. The method of claim 42, wherein the i-mail works only on a close loop formed by the registered users, any email messages can be only exchanged within the collaborative communication platform.

51. The method of claim 50, wherein all email messages exchanged by the i-mail are guaranteed to be from or to one or more of the registered users.

52. The method of claim 50, wherein composition of an i-mail message requires no email addresses of a sender and a recipient of the i-mail message, the i-mail message is a formatted electronic message including a subject and a message body.

53. The method of claim 50, wherein an i-mail message is delivered to a recipient based on a Push and Push or Push and Pull process.

54. The method of claim 42, wherein the file listed in the file list is made unavailable for download after a predefined expiration, wherein the predefined expiration is either determined by the collaborative communication platform or by a registered user that has provided the file to be listed in the file list.

55. The method of claim 42, wherein the file list in the private domain includes two listing areas, one for one of the other registered users to list one or more files to be shared with an owner of the private domain, and the other for the owner to transport files to be used elsewhere.

56. The method of claim 42, wherein the displaying of the user interface further including:

contacting from a client machine to the server;

delivering data from the server to the client machine when a user of the client machine is authorized and recognized as one of the registered users of the collaborative communication platform;

converting the data into the user interface that further shows a list of the registered users that the user can now communicate with by the i-mail, instant messaging between two or more of the registered users or in a chat room of one of a public domain, a workgroup domain or a private domain, or file sharing via a file list in one of the public domain, the workgroup domain or the private domain.

* * * * *

UNITED STATES PATENT AND TRADEMARK OFFICE
CERTIFICATE OF CORRECTION

PATENT NO. : 7,730,129 B2
APPLICATION NO. : 10/970309
DATED : June 1, 2010
INVENTOR(S) : Jinsheng Wang and Lu Wang It is certified that error appears in the above-identified patent and that said Letters Patent is hereby corrected as shown below:

Column 17, line 16, Claim 1: "(hereinafter "i-mail")" should be corrected as --as i-mail--;

Column 19, line 29, Claim 28: "all registered users" should be corrected as --all of the registered users--;

Column 19, lines 40-41, Claim 28: "(hereinafter "i-mail")" should be corrected as --as i-mail--;

Column 20, line 38, Claim 42: "(hereinafter "i-mail")" should be corrected as --as i-mail--;

Column 20, line 44, Claim 42: "transported by server administrating" should be corrected as --transported by a server administrating--;

Signed and Sealed this
Twelfth Day of July, 2011

David J. Kappos
*Director of the United States Patent and Trademark Office*